United States Patent [19]

Sakurai

[11] Patent Number: 4,467,446

[45] Date of Patent: Aug. 21, 1984

[54] ELECTRONICALLY OPERATED MACHINE FOR LEARNING FOREIGN LANGUAGE VOCABULARY

[75] Inventor: Atsushi Sakurai, Yokohama, Japan

[73] Assignee: Canon Kabushiki Kaisha, Tokyo, Japan

[21] Appl. No.: 309,074

[22] Filed: Oct. 6, 1981

[30] Foreign Application Priority Data

Oct. 12, 1980 [JP] Japan .............................. 55-143254

[51] Int. Cl.³ .............................................. G06F 15/38
[52] U.S. Cl. ...................................... 364/900; 364/419
[58] Field of Search ........................ 364/200, 900, 419

[56] References Cited

U.S. PATENT DOCUMENTS 3,602,893  8/1971  Hodges ................................ 364/200
3,892,915  7/1975  Budworth et al. .................... 364/200
3,950,734  4/1976  Li ........................................ 364/900
4,180,854  12/1979  Walden et al. ...................... 364/200

Primary Examiner—Jerry Smith
Assistant Examiner—Michael R. Fleming
Attorney, Agent, or Firm—Fitzpatrick, Cella, Harper & Scinto

[57] ABSTRACT

An electronically operated machine for learning foreign language vocabulary constructed with a plurality of bits for storing in each of them character informations constituting words; a memory device consisting of a bit to store in it a character determining information indicating whether the words stored in the plurality of bits are to be represented by the capital letter, or not; a retrieving and call-out device to call out the words stored in the memory device; and a discriminating device to determine, by the capital letter determining information stored in the determining bit for the word as called out by the retrieval and call-out device, whether the initial letter of the work starts with the capital, or not.

7 Claims, 7 Drawing Figures

FIG. 1

| b3~b0 \ b5 b4 | 00 | 01 | 10 | 11 |
|---|---|---|---|---|
| 0000 | BLANK | p | F | V |
| 0001 | a | q | G | W |
| 0010 | b | r | H | X |
| 0011 | c | s | I | Y |
| 0100 | d | t | J | Z |
| 0101 | e | u | K | |
| 0110 | f | v | L | |
| 0111 | g | w | M | |
| 1000 | h | x | N | |
| 1001 | i | y | O | |
| 1010 | j | z | P | |
| 1011 | k | A | Q | |
| 1100 | l | B | R | |
| 1101 | m | C | S | |
| 1110 | n | D | T | |
| 1111 | o | E | U | |

| b3~b∅ \ b4 | 0 | 1 |
|---|---|---|
| 0 0 0 0 | BLANK | p |
| 0 0 0 1 | a | q |
| 0 0 1 0 | b | r |
| 0 0 1 1 | c | s |
| 0 1 0 0 | d | f |
| 0 1 0 1 | e | u |
| 0 1 1 0 | f | $v$ |
| 0 1 1 1 | g | $w$ |
| 1 0 0 0 | h | $x$ |
| 1 0 0 1 | i | y |
| 1 0 1 0 | j | z |
| 1 0 1 1 | k | |
| 1 1 0 0 | l | |
| 1 1 0 1 | m | |
| 1 1 1 0 | n | |
| 1 1 1 1 | o | |

ELECTRONICALLY OPERATED MACHINE FOR LEARNING FOREIGN LANGUAGE VOCABULARY

BACKGROUND OF THE INVENTION

1. Field of the Invention

This invention relates to an electronically operated machine for learning foreign language vocabulary, or a translating machine, having a memory to store therein both a foreign language vocabulary such as, for example, English words and a domestic language vocabulary such as, for example, Japanese words equivalent to the foregin language vocabulary. By calling out from the memory a desired or random foreign word or its domestic equivalent, anyone can learn a domestic word equivalent to the foreign word, or vice versa.

2. Description of Prior Art

Electronically operated foreign language vocabulary learning machines have heretofore been known, in which Japanese words are input in the machine to translate them to their English equivalents, or vice versa.

In this type of word learning machine, it is the usual practice to use both capital and small letters, and because of this, 6 data bits are required to represent a single alphabetical letter.

SUMMARY OF THE INVENTION

It is therefore an object of the present invention to provide an electronically operated foreign language vocabulary learning machine capable of representing words of foreign language in both capital and small letters with a small quantity of data bits.

It is another object of the present invention to provide an electronically operated, foreign language vocabulary learning machine, in which a capital-or-small letter discriminating flag bit is provided at the head of each foreign word, paying attention to the fact that the initial letter of a proper noun or a personal noun, for example, always starts with a capital letter, so as to enable it to determine whether the initial letter should be represented by a capital or small letter according to the flag bit indicating "1" or "0".

It is still another object of the present invention to provide an electronically operated foreign language vocabulary learning machine comprising: a plurality of bits for storing therein character or letter information constituting words; memory means consisting of a determining bit to store therein character or letter discriminating information indicating whether the words stored in the plurality of bits are to be represented by a capital letter; call-out means to call out the words stored in said memory means; and discriminating means to determine, by the capital letter determining information stored in said determining bit for the word called out by said call-out means, whether the initial letter of said word is the capital, or not.

BRIEF DESCRIPTION OF THE DRAWING

FIG. 1 is a table for explaining the conventional technique;

DESCRIPTION OF PREFERRED EMBODIMENT

Figure 2:
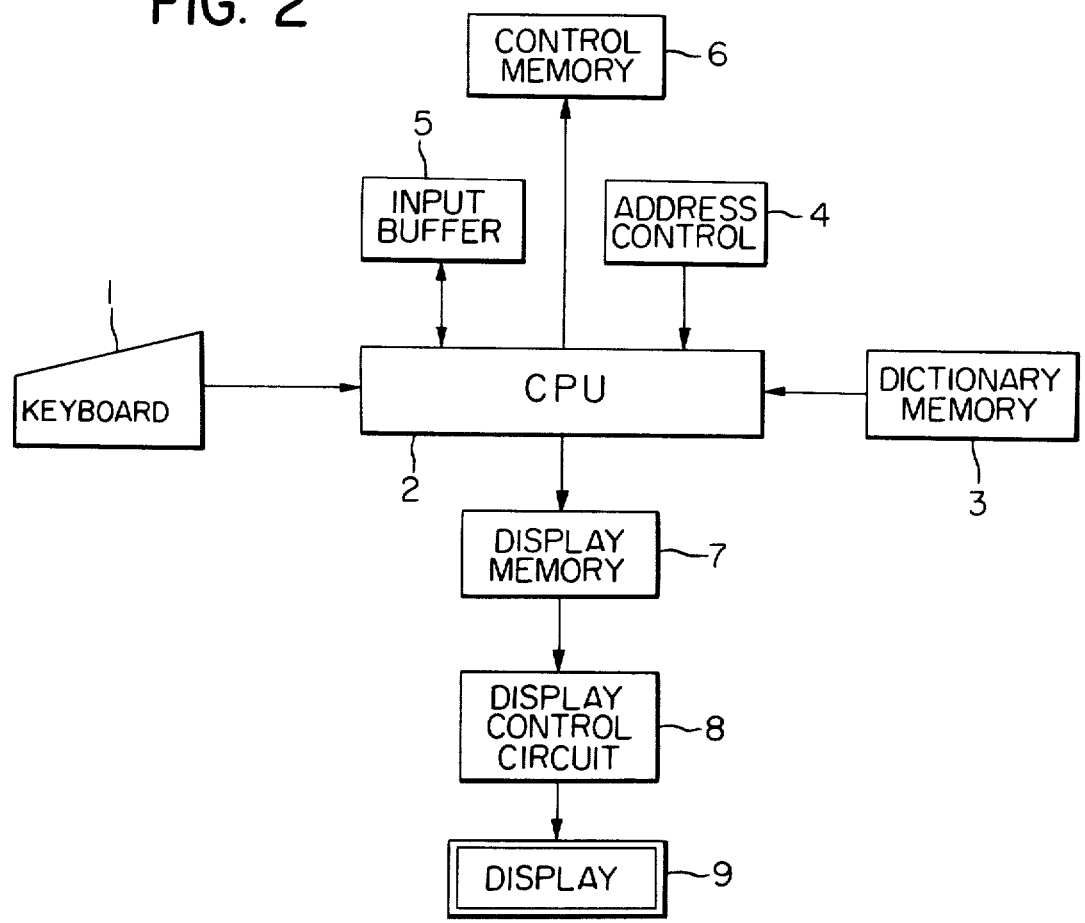
FIG. 2 is a block diagram showing one embodiment of the present invention.
Figure 3:
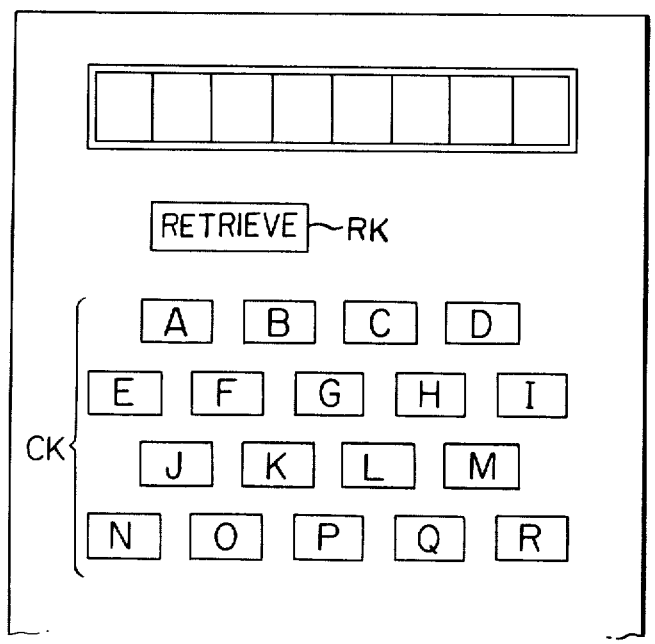
FIG. 3 shows an external appearance of a keyboard for the word learning machine.
Figures 4, 6:
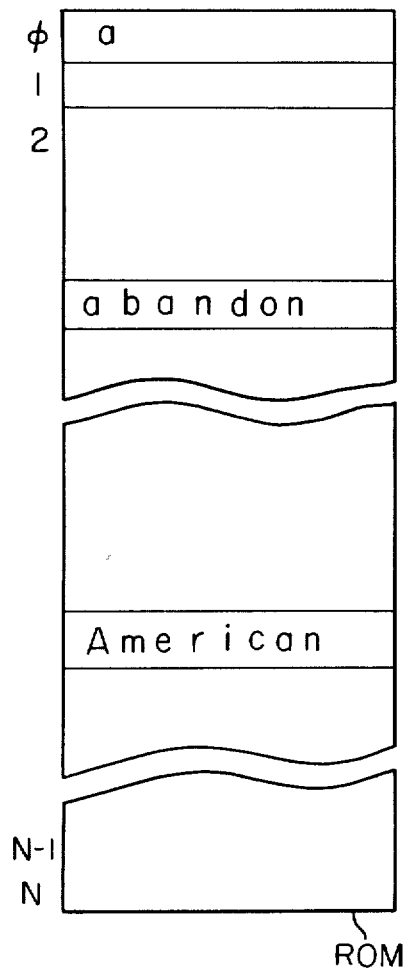
FIG. 4 is a diagram for explaining a dictionary memory.
FIG. 6 is a code table for explaining one embodiment according to the present invention.
Figure 5A:
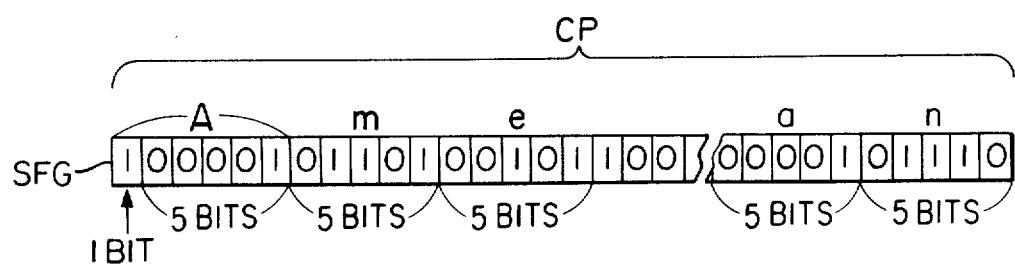
FIGS. 5A and 5B are detailed diagrams for further explanation of the dictionary memory as shown in FIG. 4.
Figure 5B:
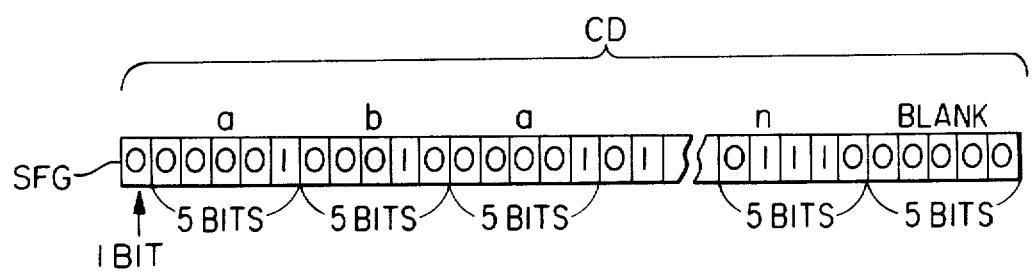

Referring to FIG. 2 showing a block diagram of a preferred embodiment according to the present invention, a reference numeral 1 designates a keyboard having a plurality of character keys CK for inputting the alphabetical letters and a retrieving key RK to retrieve a desired foreign word from a memory, as shown in FIG. 3; a numeral 2 refers to a central processing unit (CPU) to perform determination, operational processing, etc.; and 3 refers to a dictionary memory consisting of ROM, in which foreign language vocabulary is stored in each of addresses O to N, as shown in FIG. 4. Although, in FIG. 4, English words are contained in the addresses, their equivalents in other language such as Japanese may be stored therein. FIG. 5A shows further details of the contents of the dictionary memory 3 (ROM). The drawing illustrates a case, wherein a proper noun represented by the code table in FIG. 6 is stored in a data section CD, wherein a flag bit SFG is provided to discriminate whether initial letter of the word is the capital, or not. In such case, the code "1" to denote the capital is stored. FIG. 5B shows a case, wherein an English verb "abandon", which is not a proper noun, is stored, and the flag bit SFG stores therein the code "0" to denote the small letter.

A reference numeral 4 designates an address counter, wherein address informations to read out words in the dictionary memory 3 (ROM) are stored; 5 refers to an input buffer, in which the alphabetical informations input through the keyboard 1 are stored; 6 refers to a control memory which stores therein the control procedures such as explanations of the machine operations to be described later; 7 denotes a display memory which stores therein a word to be displayed; 8 designates a display control circuit which patternizes the word to be stored in the display memory 7, and effects control to forward the patternized word to a display device 9 which enables the word forwarded from the display control circuit 8 to be visualized.

Explanation will now be given as to the operations of the word learning machine of the above-described construction according to the present invention.

Alphabetical letters input from the keyboard 1 are converted to their respective key codes, and stored in an input buffer 5 through the central processing unit 2. By the key code, the central processing unit 2 (CPU) determines a retrieval starting address on the dictionary memory 3, reads a bit train for one word out of the address to convert it into a character code train, and stores the same in the display memory 7. The display control circuit 8 converts the character code train stored in the display memory 7 into the character pattern for display, and then actuates the display device 9.

For example, when the keys in FIG. 3 are depressed in the sequence of [A], [B], and [RETRIEVE], the central processing unit 2 (CPU) retrieves those words starting with letters "ab" in the dictionary memory 3 (ROM).

According to FIG. 4, since the word starting with "ab" is "abandon", the CPU obtains a bit train for the word to convert it to a character code train, and stores the same in the display memory 7. When the word "abandon" taken out of the dictionary memory 3 (ROM) is stored in the display memory 7, the central processing unit 2 (CPU) checks the content of the flag SFG.

In the case of the word "abandon", since the capital-or-small letter determining flag bit SFG indicates "0" as shown in FIG. 5B, the central processing unit 2 (CPU) takes out the subsequent five bits "00001" to convert it to a six-bit character code "000001" as a code for "a" shown in FIG. 1, i.e., a "0-bit" is added to the head of the code.

In the case of a word "American", since the capital/small determining flag bit indicates "1" as shown in FIG. 5A, the central processing unit 2 (CPU) takes out the subsequent five bits "00001", to which there are added bits "11010" to obtain a six-bit character code "011011", thereby converting it to a code different from that indicating the small letter "a".

Thus, a desired word can be taken out of the dictionary memory 3 (ROM). Since the letters after the second onward are all small, they are processed in the same manner as in the abovementioned processing of the small letter, and are forwarded to the display memory 7. Those letters which have been sent into the display memory 7 are converted into an appropriate display pattern by the display control circuit 8, and displayed on the display device 9.

It is to be noted that, in the foregoing explanations of the present invention, English vocabulary have been taken for example, but various other languages such as French, German, etc. may, of course, be used for the purpose of the present invention.

In the above-described embodiment of the present invention, the word retrieval is done by depression of the alphabetical keys. It should, however, be noted that the same display can be effected by first incrementing the contents of the address counter 4, and then making access to the dictionary memory 3 (ROM) by the counter contents.

What I claim is:

1. An electronic dictionary comprising:
   word memory means for storing a plurality of words of a given language which words are defined by a plurality of letters, each stored word comprising a train of first code information including code information for the letters of the word and determining information which indicates whether the initial letter of the word is capitol or small;
   processing means for converting the first code information for a desired word on the basis of the determining information of said word to a train of second code information which is longer than the first code information, wherein the second code information is character information for each letter and indicative of whether that letter is capital or small;
   pattern generating means for generating a character pattern on the basis of the second code information processed by said processing means; and
   display means for displaying the character pattern generated by said pattern generating means.

2. An electronic dictionary as set forth in claim 1, wherein said word memory means comprises a read-only memory.

3. An electronic dictionary as set forth in claim 1, further comprising a plurality of character keys for entering character information to said dictionary to select the desired word stored in said word memory means and at least one retrieving key for retrieving the desired word stored in said word memory means in accordance with the character information entered by operation of said character keys.

4. An electronic dictionary as set forth in claim 1, wherein each of the letters stored in said word memory means comprises code information representing a small letter and wherein the initial letter of a stored word further comprises the determining information which indicates whether the initial letter is capital or small.

5. An electronic dictionary comprising:
   memory means for storing a plurality of words of a given language, which words are defined by a plurality of letters, each word comprising a train of first code information representing its letters as N bit code information and one bit of determining information which indicates whether the initial letter of the word is capital or small;
   processing means for converting the code information for each of the letters of a desired word based on the determining information of the word to (N+1) bits of second code information, the second code information obtained by said conversion being character information for each letter and indicative of whether that letter is capital or small;
   pattern generating means for generating a character pattern based on the second code information processed by said processing means; and
   display means for displaying the character pattern generated by said pattern generating means.

6. An electronic dictionary comprising:
   memory means for storing a plurality of words of a given language, which words are defined by a plurality of letters, each stored word comprising a train of first code information including the code information for the letters of the word, and a determining information which indicates whether the initial letter of said word is capital or small;
   processing means for converting the first code information for a desired word into a train of second code information by adding a predetermined code information to the first code information;
   pattern generating means for generating a character pattern based on the second code information processed by said processing means; and
   display means for displaying the character pattern generated by said pattern generating means.

7. An electronic dictionary comprising:
   word memory means for storing a plurality of words of a given language which words are defined by a plurality of letters, each stored word comprising a code information train representing said letters by first code information including the letters of the word and a determining information indicating whether the initial letter of said word is capital or small;
   input means for entering character information to be an index mark for retrieval of a desired word stored in said memory means;
   means for retrieving one of said words stored in said memory means based on character information entered by said input means; and
   display control means for converting the first code information for a desired word which has been retrieved from the memory means into a train of second code information which is longer than the first code information, wherein the second code information is character information for each letter and indicative of whether that letter is capital or small, and for controlling the display of character patterns based on the second code information.

* * * * *

UNITED STATES PATENT AND TRADEMARK OFFICE
CERTIFICATE OF CORRECTION

PATENT NO. : 4,467,446
DATED : August 21, 1984
INVENTOR(S) : ATSUSHI SAKURAI

It is certified that error appears in the above-identified patent and that said Letters Patent is hereby corrected as shown below:

COLUMN 1

Line 14, "foregin" should read --foreign--.

COLUMN 3

Line 47, "capitol" should read --capital--.

Signed and Sealed this

Twenty-seventh Day of August 1985

[SEAL]

Attest:

DONALD J. QUIGG

Attesting Officer     Acting Commissioner of Patents and Trademarks